(12) United States Patent
Stuppi

(10) Patent No.: US 12,384,654 B2
(45) Date of Patent: Aug. 12, 2025

(54) SIGNALIZATION APPARATUS

(71) Applicant: Kone Corporation, Helsinki (FI)

(72) Inventor: Claudio Stuppi, Helsinki (FI)

(73) Assignee: Kone Corporation, Helsinki (FI)

(*) Notice: Subject to any disclaimer, the term of this patent is extended or adjusted under 35 U.S.C. 154(b) by 1437 days.

(21) Appl. No.: 16/921,214

(22) Filed: Jul. 6, 2020

(65) Prior Publication Data
US 2020/0331724 A1 Oct. 22, 2020

Related U.S. Application Data

(63) Continuation of application No. PCT/FI2018/050220, filed on Mar. 22, 2018.

(51) Int. Cl.
B66B 1/46 (2006.01)
B66B 13/14 (2006.01)
G06F 3/044 (2006.01)
G06F 3/0488 (2022.01)

(52) U.S. Cl.
CPC ........... B66B 1/463 (2013.01); B66B 1/468 (2013.01); B66B 13/143 (2013.01); G06F 3/044 (2013.01); G06F 3/0488 (2013.01); B66B 2201/463 (2013.01)

(58) Field of Classification Search
CPC ....... B66B 1/463; B66B 1/468; B66B 13/143; B66B 2201/463; G06F 3/044; G06F 3/0488
See application file for complete search history.

(56) References Cited

U.S. PATENT DOCUMENTS 7,711,565 B1 * 5/2010 Gazdzinski ............ B66B 1/468
369/30.01
9,342,195 B2 * 5/2016 Zhang .................. G06F 3/0416
2017/0144859 A1 * 5/2017 Scoville ................ B66B 1/468
2017/0313546 A1 11/2017 King
(Continued)

FOREIGN PATENT DOCUMENTS

CN 104555628 A 4/2015
CN 205575298 U 9/2016
(Continued)

OTHER PUBLICATIONS

Office Action dated Dec. 13, 2022 issued in related Chinese patent application No. 201880089027.9.
(Continued)

Primary Examiner — Jeffrey Donels
(74) Attorney, Agent, or Firm — Harness, Dickey & Pierce, P.L.C.

(57) ABSTRACT

According to an aspect, there is provided a signalization apparatus, the signalization apparatus comprising a first input module comprising a capacitive proximity sensing arrangement configured to detect a gesture from a user; a second input module comprising at least one signalization interface element and configured to detect an input from the user; an analysis module coupled to the first and the second input module and configured to analyze signals received from the first and the second input module to generate a control signal; and an interface coupled to the analysis module and configured to receive the control signal and provide the control signal to a controller.

11 Claims, 2 Drawing Sheets

(56) References Cited

U.S. PATENT DOCUMENTS

2018/0052519 A1* 2/2018 Amores-Llopis ....... H04L 67/12
2018/0127234 A1* 5/2018 Lofberg .................. B66B 3/002

FOREIGN PATENT DOCUMENTS

| CN | 205873553 U | 1/2017 | | |
|----|----|----|----|----|
| CN | 106458505 A | 2/2017 | | |
| CN | 107444997 A | 12/2017 | | |
| CN | 107758457 A | 3/2018 | | |
| CN | 107765845 A | 3/2018 | | |
| EP | 3141510 A1 | 3/2017 | | |
| WO | WO-2007/132499 A1 | 11/2007 | | |
| WO | WO-2013/178285 A1 | 12/2013 | | |
| WO | WO-2015183256 A1 * | 12/2015 | ............. | B66B 1/468 |
| WO | WO-2016124810 A1 * | 8/2016 | ............. | B66B 1/463 |

OTHER PUBLICATIONS

International Search Report PCT/ISA/210 for International Application No. PCT/FI2018/050220 dated Nov. 22, 2018.

* cited by examiner

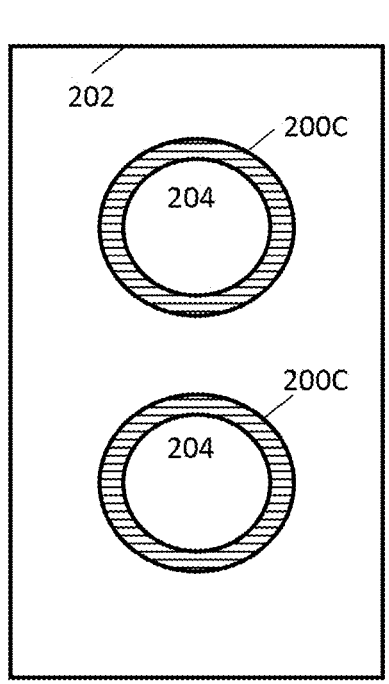
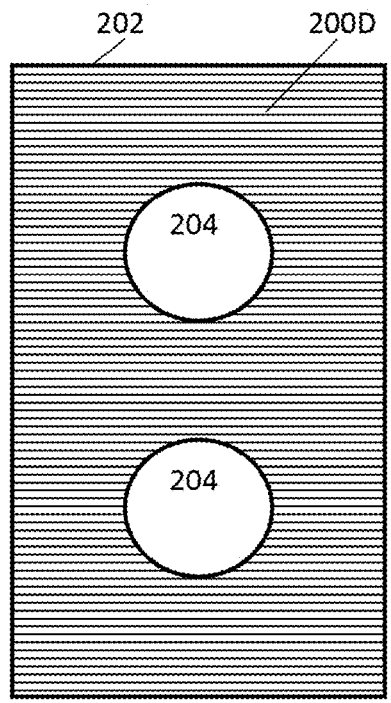
FIG. 2C
FIG. 2D
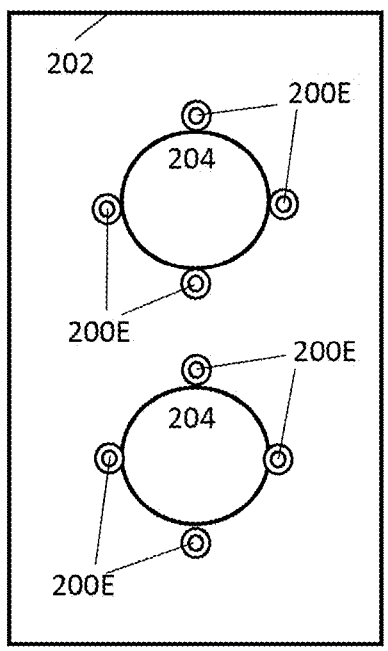
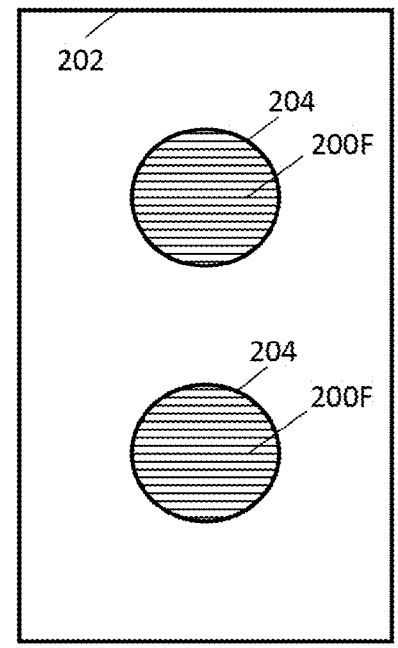
FIG. 2E
FIG. 2F

SIGNALIZATION APPARATUS

CROSS-REFERENCE TO RELATED APPLICATION

This application is a continuation of PCT International Application No. PCT/FI2018/050220 which has an International filing date of Mar. 22, 2018, the entire contents of which are incorporated herein by reference.

BACKGROUND

Signalization devices traditionally comprise signalization buttons for signaling user requests to a control unit. Physical or virtual buttons are problematic in certain environments with high sanitary standards, such as hospitals or processing facilities which require good hygiene.

Therefore, there is a need for a solution that would address at least one of the above drawbacks.

SUMMARY

According to at least some of the aspects, a solution is provided that enables signalization by capacitive gesture recognition alongside with traditional touch inputs or other alternative inputs using, for example, physical buttons or soft buttons provided by a touch screen. The solution enables touchless control useful, for example, in environments with a demand for high hygiene. By providing alternative signalization means, high service availability may be guaranteed. In addition, wearing of the signalization apparatus may be avoided.

According to a first aspect, there is provided a signalization apparatus. The signalization apparatus comprises a first input module comprising a capacitive proximity sensing arrangement configured to detect a gesture from a user; a second input module comprising at least one signalization interface element and configured to detect an input from the user; an analysis module coupled to the first and the second input module and configured to analyze signals received from the first and the second input module to generate a control signal; and an interface coupled to the analysis module and configured to receive the control signal and provide the control signal to a controller.

In an embodiment, the capacitive proximity sensing arrangement is circumferentially arranged at edges of the signalization apparatus.

In an embodiment, in addition or alternatively, the capacitive proximity sensing arrangement surrounds the at least one signalization interface element.

In an embodiment, in addition or alternatively, the capacitive proximity sensing arrangement is integrated to the at least one signalization interface element.

In an embodiment, in addition or alternatively, the signalization apparatus comprises an elevator signalization device and the controller comprises an elevator controller or an elevator group controller.

In an embodiment, in addition or alternatively, the control signal comprises floor call to upper floors.

In an embodiment, in addition or alternatively, the control signal comprises a floor call to lower floors.

In an embodiment, in addition or alternatively, the control signal comprises a request to open a door.

In an embodiment, in addition or alternatively, the control signal comprises a request to close a door.

In an embodiment, in addition or alternatively, the at least one signalization interface element comprises at least one physical button.

In an embodiment, in addition or alternatively, the at least one signalization interface element comprises at least one button provided by a touch screen.

According to a second aspect, there is provided an elevator system comprising an elevator controller; and the signalization apparatus of the first aspect.

According to a third aspect, there is provided a signalization apparatus. The signalization apparatus comprises first input means comprising a capacitive proximity sensing arrangement configured to detect a gesture from a user; second input means comprising at least one signalization interface element and configured to detect an input from the user; analysis means coupled to the first and the second input means and configured to analyze signals received from the first and the second input means to generate a control signal; and interface means coupled to the analysis means and configured to receive the control signal and provide the control signal to a controller.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings:

FIG. 2C illustrates an arrangement of input modules of the signalization apparatus according to another embodiment.

FIG. 2D illustrates an arrangement of input modules of the signalization apparatus according to another embodiment.

FIG. 2E illustrates an arrangement of input modules of the signalization apparatus according to another embodiment.

FIG. 2F illustrates an arrangement of input modules of the signalization apparatus according to another embodiment.

DETAILED DESCRIPTION

Figure 1:
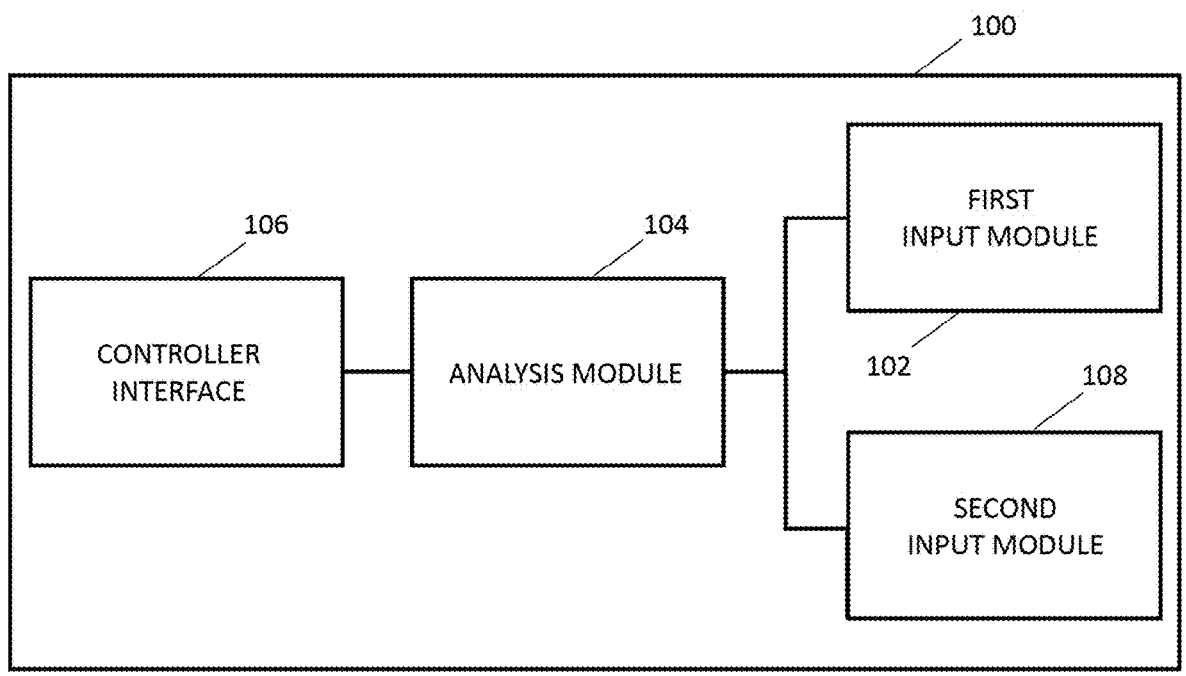
FIG. 1 illustrates a signalization apparatus according to an embodiment.

FIG. 1 illustrates a signalization apparatus 100 according to an embodiment. The signalization apparatus 100 may enable receiving user inputs by simple gestures as well as by touch inputs.

In FIG. 1, the signalization apparatus 100 comprises a first input module 102 comprising a capacitive proximity sensing arrangement configured to detect a gesture from a user. The capacitive proximity sensing arrangement may be a capacitive sensor pattern or film, or any other sensor arrangement capable of sensing contact-free gestures. The signalization apparatus 100 may comprise a second input module 108 comprising at least one signalization interface element and configured to detect an input from the user. The second input module 108 may comprise a traditional signalization module comprising physical buttons and configured to detect touch inputs. As another example, the second input module 108 may comprise a touch screen configured to provide virtual buttons that may be controllable by a touch and/or touchless gestures. Alternatively, additionally or instead of virtual buttons, the touch screen may provide an interface for three-dimensional (3D) gestures based control, for example, with electrical near-field sensing. The signalization apparatus 100 further comprises an analysis module 104 coupled to the first input module 102 and the second input module 108. The analysis module 104 is configured to analyze signals received from the first input module 102 and the second input module 108 to generate a control signal. The signalization apparatus 100 further comprises an interface 106 coupled to the analysis module 104 and configured to receive the control signal and provide the control signal to a controller.

The illustrated solution enables touchless control useful, for example, in environments with a demand for high hygiene. By providing signalization via two separate input modules, high service availability may be guaranteed. As the user input recognition and analysis is implemented by the signalization apparatus, no external cameras, sensors or cables are needed. In addition, by utilizing touchless gestures as user inputs, wearing of traditional buttons is avoided. Moreover, when 3D gesture recognition is used, touchless gestures may be recognized even in situations where the user wears, for example, thick protective gloves and therefore the capacitive proximity sensing arrangement may not be able to respond. Further, as the signalization module comprises two separate input modules, the solution increases reliability as the signalization apparatus remains operational even if one input module is not operational.

In an embodiment, the analysis module 104 may be configured to elaborate/amplify the signals received from the capacitive proximity sensing arrangement. The analysis module 104 may also be configured to process the signals to recognize a specific gesture based on the signals.

In an embodiment, the signalization apparatus 100 may comprise an elevator signalization device and the controller may comprise an elevator controller or an elevator group controller. In another embodiment, an elevator system comprises the signalization apparatus 100 and an elevator controller. The signalization apparatus 100 may be located, for example, in an elevator lobby or inside an elevator car.

The control signal may comprise a floor call to upper or lower floors. For example, the analysis module 104 may be configured to generate a control signal indicating an elevator call to lower floors in response to analyzing a predefined gesture. The predefined gesture may be, for example, a simple hand gesture indicating a downward movement. The analysis module 104 may be also configured to generate a control signal indicating an elevator call to upper floors in response to analyzing a predefined gesture. The predefined gesture may be, for example, a simple hand gesture indicating an upward movement. As another example, the predefined gestures may comprise rotary gestures, such as a clockwise or counterclockwise gesture. Alternatively, the control signal may comprise a request to upper or lower floors in response to a touch input received from the second input module 108.

In one embodiment, the control signal may comprise a request to open or close a door. For example, the analysis module 104 may be configured to generate a control signal indicating a request to close a door in response to analyzing a predefined gesture. The analysis module 104 may be also configured to generate a control signal indicating a request to open a door in response to a predefined gesture. The predefined gesture may be, for example, a simple hand gesture indicating a sideways movement to the left or to the right. Alternatively, the control signal may comprise a request to open or close a door in response to a touch input detected by the second input module 108. A door may refer to an elevator door, or any other door system capable of receiving control signals.

The signalization apparatus 100 also comprise at least one processing unit and at least one memory connected to the at least one processing unit. The at least one memory may comprises program instructions executable by the at least one processing unit to control the operations of the signalization apparatus 100.

The signalization apparatus 100 may also comprise first input means comprising a capacitive proximity sensing arrangement configured to detect a gesture from a user; second input means comprising at least one signalization interface element and configured to detect an input from the user; analysis means coupled to the first and the second input means and configured to analyze signals received from the first and the second input means to generate a control signal; and interface means coupled to the analysis means and configured to receive the control signal and provide the control signal to a controller. The illustrated input means may comprise at least one of capacitive sensor(s), other near-field sensor(s), a touch screen and mechanical button arrangement. The analysis means may comprise at least one processing unit, or using at least one processing unit connected to at least one memory. The interface means may comprise data bus or data interface connected to the at least one processing unit.

FIGS. 2A-2F illustrate exemplary arrangements of the input modules of the signalization apparatus 100 according to embodiments. The first input module may be easily integrated in existing signalization devices. Thus, reliability and durability of the signalization device may be increased at low cost when no external sensors are needed.

Figures 2A, 2B:
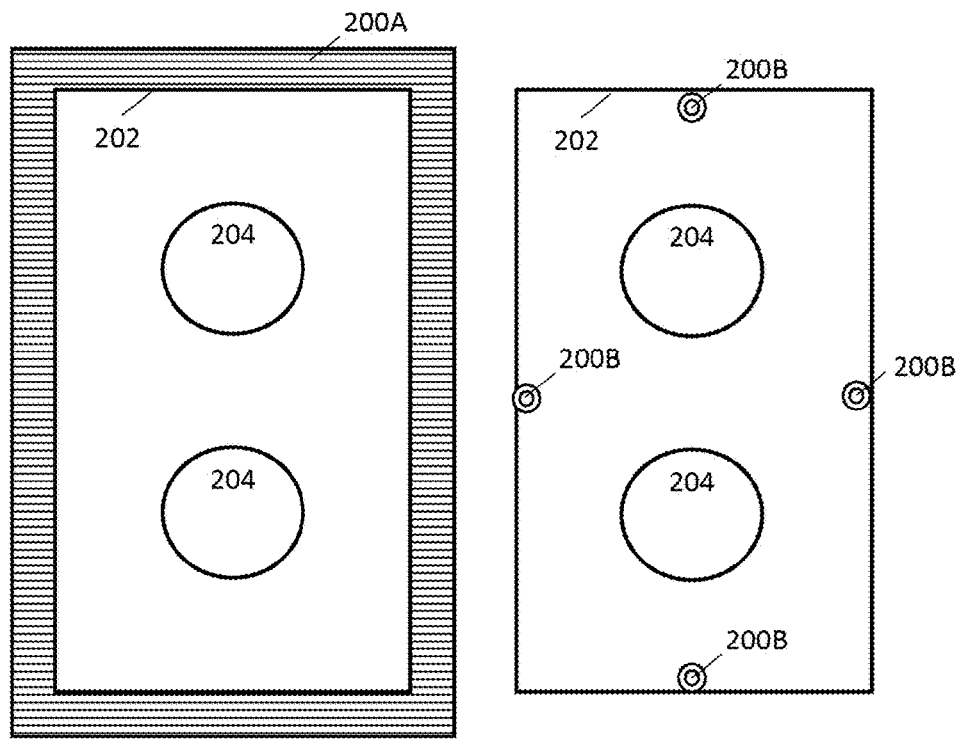
FIG. 2A illustrates an arrangement of input modules of the signalization apparatus according to an embodiment.
FIG. 2B illustrates an arrangement of input modules of the signalization apparatus according to another embodiment.

In FIGS. 2A and 2B, a capacitive proximity sensing arrangement 200A is circumferentially arranged at edges of the signalization apparatus 100. The capacitive proximity sensing arrangement 200A may be, for example, a capacitive sensor pattern or film framing the signalization device 100, as illustrated in FIG. 2A.

FIG. 2B illustrates another possible arrangement, where a capacitive proximity sensing arrangement 200B comprises sensors integrated on edges of the signalization device 100. Although FIG. 2B illustrates that one sensor may be located at each edge of the signalization device 100, there may be multiple sensors at each edge.

In FIGS. 2C-2E, the capacitive proximity sensing arrangement surrounds the at least one signalization interface element 204. The signalization interface element 204 may be, for example, a physical signalization button. A capacitive proximity sensing arrangement 200C may surround the at least one signalization button 204 as a frame, as illustrated in FIG. 2C. As another example, a capacitive proximity sensing arrangement 200D may surround the at least one signalization button 204 by covering the rest of the second input module 202, as illustrated in FIG. 2D. The capacitive proximity sensing arrangement 200D may be implemented, for example, with a film that is capable of sensing contact-free gestures.

FIG. 2E illustrates a solution where a capacitive proximity sensing arrangement 200E comprises individual sensors integrated circumferentially on sides of the at least one signalization button 204.

In FIG. 2F, a capacitive proximity sensing arrangement 200F is integrated to the at least one signalization button 204 of the second input module 202. The capacitive proximity sensing arrangement 200F may be implemented, for example, with a film that is capable of sensing contact-free gestures.

Although FIGS. 2A-2F have been described to use the signalization buttons 204 as examples of the at least one signalization interface element, in other examples, the second input module 202 may comprise a touch-sensitive screen configured to provide virtual buttons that may be controllable by a touch and/or touchless gestures. Therefore, the at least one signalization interface element may also refer, for example, to a touch sensitive screen or at least one virtual button provided by the touch-sensitive screen. Further, the virtual buttons may be controllable by touch and/or touchless gestures. The touch-sensitive screen may, in one example, provide an interface for three-dimensional (3D) gestures based control, for example, with electrical near-field sensing.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. All or a portion of the example embodiments can be conveniently implemented using one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments can be implemented by the preparation of application-specific integrated circuits or by interconnecting an appropriate network of conventional component circuits, as will be appreciated by those skilled in the electrical art(s). Thus, the examples are not limited to any specific combination of hardware and/or software. Stored on any one or on a combination of computer readable media, the examples can include software for controlling the components of the example embodiments, for driving the components of the example embodiments, for enabling the components of the example embodiments to interact with a human user, and the like. Such computer readable media further can include a computer program for performing all or a portion (if processing is distributed) of the processing performed in implementing the example embodiments.

Furthermore, in the claims means-plus-function clauses are intended to cover the structures described herein as performing the recited function and not only structural equivalents, but also equivalent structures.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. An elevator signalization apparatus, the elevator signalization apparatus comprising:
    a first input module comprising a capacitive proximity sensing arrangement configured to detect a gesture from a user;
    a second input module comprising at least one signalization interface element and configured to detect an input from the user;
    an analysis module coupled to the first and the second input module and configured to analyze signals received from the first and the second input module to generate a control signal; and
    an interface coupled to the analysis module and configured to receive the control signal and provide the control signal to an elevator controller or elevator group controller;
    wherein the first input module and the second input module are operable simultaneously, and
    wherein the capacitive proximity sensing arrangement of the first input module at least one of surrounds the at least one interface element of the second input module or is integrated to the at least one interface element of the second input module.

2. The elevator signalization apparatus of claim 1, wherein the capacitive proximity sensing arrangement is circumferentially arranged at edges of the signalization apparatus.

3. The elevator signalization apparatus of claim 1, wherein the capacitive proximity sensing arrangement surrounds the at least one interface element.

4. The elevator signalization apparatus of claim 1, wherein the capacitive proximity sensing arrangement is integrated to the at least one interface element.

5. The elevator signalization apparatus of claim 1, wherein the control signal comprises floor call to upper floors.

6. The elevator signalization apparatus of claim 1, wherein the control signal comprises a floor call to lower floors.

7. The elevator signalization apparatus of claim 1, wherein the control signal comprises a request to open a door.

8. The elevator signalization apparatus of claim 1, wherein the control signal comprises a request to close a door.

9. The elevator signalization apparatus of claim 1, wherein the at least one signalization interface element comprises at least one physical button.

10. The elevator signalization apparatus of claim 1, wherein the at least one signalization interface element comprises at least one button provided by a touch screen.

11. An elevator system comprising:
    an elevator controller; and
    the elevator signalization apparatus of claim 1.

* * * * *